(12) United States Patent
Manning

(10) Patent No.: X5369
(45) Date of Patent: Feb. 16, 1829

(54) LEKTOGRAPHY

(76) Inventor: James B. Manning

Joseph B. Manning.
Letters Patent

The schedule referred to, in these Letters Patent & making part of the same, containing a description in the words of the said Joseph B. Manning himself, of his improvement in the art of Alphabetical writing called Lektography.

---

The object of this improvement is to supply what is wanting in the analysis, classification, & representation, of the elementary sounds of English pronunciation, for pronouncing dictionaries, & for all the uses to which an equivalent, or uniform orthography may be applied — to supply these deficiencies of system, distinctness, simplicity, consistency, usage & analogy, using the letters of the Roman or common alphabet, with due conformity to their ancient & continued powers. and thus to form an exact consistent & practical notation, which may be as perfectly exclusive of marks not found in the alphabet, as the english orthography would be, were it reformed on the original plan of its own usages & analogies, & the correspondent usages of other languages — The letters employed for this object, being referred to the general pronounciation of known words in several of the modern languages, may be distinctly significant of the sounds intended by them; & may form a general alphabet & system of usages, suited to the similar & equivalent usages of orthography, & the habits of ear & eye, to which readers of the English & French languages are accustomed: — The term Lektography, (represented as lektographie,) is invented for this manner of representing the sounds of words. Every modern scheme of notation, whatever are its peculiarities, is in part selected from some common usages. The term now employed for such representations of words is alike significant of selected usages of writing, & written distinctions of pronounciation.

2. The many methods of notation which have been devised for representing the sounds of words more certainly & uniformly, than they are expressed by the orthography of the words themselves in the English or French language, shows the propriety of establishing, if possible, some more exact & more general expression of sounds, & how desirable it is for certain purposes to render those methods practically useful for the purposes of their formation, to the nations for which they are intended, they are nearly conformed to the usages of their lan-
-guages. The principal differences in the systems intended for the same nation
are their different degrees of this conformity, which extend from the orthography
itself, made to denote its pronounciation by many additional marks, to the
adoption of such part of its usages only, as "approaches to perfection"; measu-
-red by the standard of scholastic prosody, the Italian school manner of reading
Latin. These extremes have their several inconveniencies. But the usages which
may be adopted with less of inconvenience, are not all equally eligible...
To those of the english language, which have been preferred for being most mar-
-kedly peculiar, or most numerous & susceptible of rules, additional marks are
added in the systems formed of them. In the great variety of silent letters, so
called which have place in the orthography of the english, French & Greek
languages, it is manifest that some signs of distinction were always necessa-
-ry, to the best expression of the vowels, & equally evident that other regulations
& analogies were formerly more cultivated than those which are thus prefer-
-red & which thus require additions to mark their varieties of value....
The regulations of the early writers, by which they formed the usages now found
in the English language, cannot perhaps be exactly pointed out; nor is it desira-
-ble to resume all the reasons of their orthography. It will be sufficient for
the purposes of this description, to point out some of the sources of the common
usages of orthography in the English & other European languages. Their con-
-venience and classical superiority may then be better estimated.......
3. The mute e, as in plane, is employed by English orthoepists to mark the
a of plain &c. & as in dele, to mark the e of ceil &c. The Russian, French &
English languages employ the mute e in nearly the same manner. It was
originally an initial letter, & was placed after consonants to show that their
inherent vowel sound is not then used. This employment of the mute e
may be explained by the manner of using the javanese consonants; as
described by Sir T. S. Raffles. Each of these consonants is a syllable ending
in the sound of awe in place of the signs & sounds of better usage. Hence by this
device, three characters are made necessary to express be like BbE: four to express
bet, bit, but (ambiguously) like BbTb; five to express bit or beet, like BbETb;
& so other combinations, in which for the sake of a few short expressions, many characters are made necessary &c. 4. Other usages of the English orthography are
ai, ay, ei, ey, for a final: ie, ea, ee, ey, for e final: y, ai, ei, eye, uy, ie, igh for i fi-
nal: oi, oy, for oe final; oa, oe, ough ow, for o final; aw, ow for au or ou final;
ue, ew &c. for u final &c. The Sanscrit vowels have forms or additions, for sounds
after consonants, different from those used for sounds before consonants; or forms &
values of the vowel letters, varied with their positions: like b-ut, & br-t or but, & brot.
In analogy with the Sanscrit abbreviations, the English word ad or add is va-
ried as aid, for the final sound of the a; and day or daily, has its German
form in tag-tich; and the German tag, has its English form in [illegible]. So the En-
glish word fruit, answers to the Latin fructus, fruges, fruor; & the word, Tuesday,
answers to the Latin duco, dux, ducis, virtus; the German thun, tugend; & the
Dutch doe, or do. The Greek language has or had ai, ei, and oi, in like analogy; as in
the Greek & German infinitives: aix, ein, oin, for egen, igen, ogen; with other
varieties of resolution & contraction. Other forms of the Sanscrit vowels used in
N. R. S. or characters so rendered, so the Latin hones, honor: French honneur:
English, honour; aurum, or acht, oht, ought: straw, saw, [illegible]. [illegible]. J. H. B. H.
J. A H. Baa &c. 5. The English values of the vowel letters are their ancient usages.
The English A, has the correspondence of the French ai as in humaine, humane,
plaine, plain, for the Latin a of humana, clarum; so the Greek ais, for the En-
glish ace, and the Latin as: & the French ais, for some forms of a, & for nitre joints
or points: so the Armenian aip, the French & Persian ai, now ai, e, or ain & annum
&c. & the Arabic ain, I for C, or E, for Samaritan III, or Sanscrit I, ai or oi, diph-
thongal, now like ai, ei, e, French: as in they, there, &c. for the English E; which
is the same in power as the British u, in bury, û, in pûmp, (for pute, V or 5; the
Sanscrit e, ee, or second vowels, & the Persian E: there is the correspondence of this,
these, & the ancient Latin quis, ques, like omnis, omnes, (or omneis & virgeis, like
the Greek eis: the more ancient form of es & is plural signs in Latin,) of Greek
H, short & long, like I, in the French inne, and Eglise; or I for E, as, Ecel E sia;
with other usages of like values, showing the agreement of the English & ancient
powers of the vowels — 6. The Latin usages were various like the English:
and like these too, they were inconsistent with the apportionment of quanti-
ties & the harmony of numbers, which modern scholars have ascribed to the
ancients. The Latin language had its varieties of orthography, & was reformed before the christian era, it then was purposely abbreviated, by using some letters
in several values, or omitting in the stenographic & popular manner of those
early times, nearly all the letters which were not indispensable to an intelligi-
-ble expression of words. At that time different alphabets & usages were accu-
-mulated to an inconvenient degree, as they now are in the English & French
orthography. Though the letters in the new orthography took less various uses,
the former & subsequent expressions were necessarily equivalent in the same
words in both, monograms were used, that is single letters for several which
were sometimes fully expressed in the same words. Thus E & I. being different
forms of yod, are described by Roman authors, as being interchanged in the same
words, short or like e. or y final, in here. heri quase; so in melle Latin.
meli. Greek; & long like ae. (ai Greek, compound or diphthongal; like I. of early
English for ay. (yes) in since I dance, &c. I. is also described, as used for II.
in sub-jicit, the first having the force of a consonant, for the purpose of
such division, as in subject. making sub a short, or short sound, long as to
verse by position; that is by stress. thus the E & I had anciently the various
powers of the English I, & Greek I; as also of the broad diphthong ay. again
the o of the earliest Greek & Latin, like the Syriac oo, had all the powers
of o & ou, French: oo & oe. Dutch, in door, shoe &c. o. being used to correct
the e, sound of u, as in shoe; & u, to correct the o. for ou Greek, as in
joure. reformed by omitting the o as in jure. &c. In the equivalency
of versus furtum & the old orthography, versos. fortom, may be observed
the same variety of expression, as for the sounds of the English words, her,
word, hurry, worry: & the similar usages of Dutch, German & French words-
&. The Latin orthography is varied to form the Italian; the oral Latin
or Italian, being similar to the English manner of reading Latin -
The modern Italian, considered as being the continued popular oral La-
-tin, was again reformed some eight centuries since; or rather, was inves-
-ted anew in [illegible] usages of orthography. In the modern orthography,
mele, has one variety of sound for the Latin mala; & another for the Latin
melle; Greek meli: so levano has e. for a of Lavinium; & oggi, has i for e
of hodie; so other words, & other vowels. But the scholastic perfection of or-
-thography, conciseness of vowel expression, or the sameness of shorts & longs, is now the frequent inconvenience in the acquisition of the Italian languages, as of others. The accent marks, (not the marks of quantity) distinguished different sounds of the vowels, probably in the school books of the Greeks & Romans, as they now do in the British language, & some others; that is, where the sounds were not directed by the flexions. But these usages of the ancients & moderns are now so variously received or practised, that the accents of neither can be conveniently adopted as general marks of the vowels.

8. The different methods for distinguishing vowel sounds, which of late have most obtained, & are found in pronouncing dictionaries, are too generally known to require being stated for the purpose of this description. One remark is applicable to them all: their accent marks, & ciphers employed to qualify conflicting usages do not supply a consistent lektography, nor indicate the most eligible orthography for new words. To be well adapted to the general usages of the language, or rather to be adapted to the uniform expression of like sounds in every position, the lektography of the dictionary should be as little objectionable, as if the best improvement of the common orthography were proposed. Few scholars would deliberately adopt the accent marks, & ciphers for shewing the sounds of the vowels in such an improvement. And from the want of analogy in the usages which are employed with such marks; together with the multiplied types which these require; they are sufficiently inconvenient to be very readily exchanged for any other usages which are more simple & analogous than those, & are as usual to the reader, being also usages of the common orthography.

9. In comparing the schemes of English orthoepists, the a of all awe, caw, appear to be unnecessary for representing the o of oloi, the Greek, or oll, the Welsh original of all, the o of oht, the Anglo-Saxon, or ought, the English word; or corvus, & corbie, formed of the sound caw. So to the a of farm, was not necessary to express the broad sound of I in firma, the Latin word, nor the a of Serrare, Italian, to express the I of SamInium - the one is as classical as the other. The A is the greek; the I is the Latin usage. In both the sound was called short & marked acute. Hence the Latin Jupiter, from pater; MithrIdates, from MithrAdates; &c. Authorities for this on one side are, the Egyptian OI (or and ai): Arabic ain & ha: I & II or H, as in ICHWH and IO; Cicero's I broad: when too broad like E broad in excess, & on the other side; the sounds of a in fate, fare, are a circumflex or long in the British orthography; the sounds of a in carry, & cart, being short or acute; as in ysgarmes, for skirmish; amunhersonol for impersonal; so an for in & un, &c. of other Latin derivations.

10. The british usages are the source of the like apportment of the sounds of a in the system of Wallis, & thence in the scheme of Sheridan. But the objections of Parry, Walker & others to Sheridan's want of a distinct mark for the a of cart, are not less applicable to their own want of separate marks for the a of cara, & for other letters. For instance; the u of but & hurry, is not an equivalent for the e of her, or the u of murmur.. for is the general usage or the "common sound" in her, Derby, &c. well marked like the e of merry. The e of mercy, though marked for a sound like ie of vierge, French ee. of seer, (ê. welsh & Roman) ère of there, French or eyre, of they're (er Tuscan) by the e of merry or met_ is not in analogy with any one of these expressions nor is it English. And though it may be most usual to sound the letter u like eu offend, or ew of few; & nearly like the Dutch u & uw for you; and as nearly like the French û & eû; it is not agreeable to the eye, nor is it necessary for the sake of usage & distinctness to read feud, rule, move, & the like, in the letters, fude, rool, moov, - But muev, for move, is as easily read as duv, guvun for dove, govern. And eu as in feud, & u as in rule or true, fruit, are English usages & are necessary to preserve analogy; which is marred by oo of root, &c.

11. By this apportment of the vowel sounds & letters, as in the common usages which have been instanced, it is evident that one of the three sounds of each letter may be represented by the letter itself, without any mark over it: & the marks, or want of mark, may be made to designate, the same class of sounds fate, theme &c. fat, them; &c fare, her; &c. The sound of i in firm, like farm, (with ferm for firm) not now being English, (though good usage in the Scotch dialect.) was the only difficulty in the way of this apportment; all the other expressions appeared to be regular usages, as well as the sounds of the usual. tered expressions. This objection to the scheme above suggested for simplifying the signs of the vowel sounds, has appeared to be most important, because of the classical, Augustan character, affixed to the a of farm, as the "Italian A." To part with such an appendage, was deemed to be wholly irreconcilable to scholars; with whom the Italian method of reading Latin, is the Latin – But the attention since given to this subject, has led to the discovery of the affinity of Greek, Syriac or Runic, & Latin usages; as of these & the usages of the modern languages; in other & more vernacular relation than those which are cultivated in the higher schools of Europe –

12. To refer the the general usage of a in father, farm, to the I of Roman pronounciation, in firma, &c. though unusual to the scholars of the present time, may be less repugnant than on first impressions, after considering the following note; (Hallams middle ages) "Irnerius is sometimes called Guarnerius, sometimes Warnerus; the German W, is changed into Gu by the Italians, & occasionally, omitted, especially in Latinizing, for the sake of euphony, or purity." "The Italian language contains many instances of ar or a used in place of the Latin ir; i, and er; the i & e being the same letter for various sounds – ... In this instance of rendering the ar into Latin by ir, it appears that the scholars of the twelfth century were accustomed to this reciprocal exchange, as a Latin school usage for the Dutch & Italian ar – The same use of ir in Sirba seems indicated by the venetian Zarba — –

13. An objection may here occur to the scholar like this; admitting the views of the correspondence of Roman, Oriental, & modern usages to be correct, can the public be benefitted by simplifying comparative orthography in any conformity to these suggestions? In other words; are the common usages here selected less practical, because their simplicity, analogy, & classical origin, are commended to the scholar by appeals to his intelligence & learning? — Waiving the consideration of the erudition in which the english principles of pronunciation are now involved; it is answered that the inconvenience of that cannot be much increased to the english reader by the addition of the few facts that are necessary, to be known, such as above stated. And if the explanation of English usages can, in any considerable degree, be divested of such erudition by plain matters of fact, they will not be refused by the public; & cannot want utility. The English reader has found no great inconvenience in naming the a of all, the German a; the a of farm, the Italian a; nor the French reader in naming the y. Greek i (e;) & in using the other names to which he is accustomed for other usages – 14. It is no less proper to distinguish other letters in the same manner – And much that is said beyond such limits, is not admitted in what is considered to be adapted to the English school dictionary.
Thus the u, of busy & utas where eta (eight) is so written, is the Welsh u, and i.
The u & i are exchanged in the Scotch ull for ill, hinney for honey, &c. The u
had these values in some Anglo-Saxon words; & in some Latin words, as maxumus,
for maximus, Brundusium (Greek (Brentesicon.) now Brindici. And the En-
glish orthography is indebted to the Welsh usages for f, in of, ff in off, dd,
(th) in tedder; g in get, and proper names; ce, ci for ke, ki, in proper names;
to the Syriac waw for the o in do, &c.&c. Had some orthoepists been apprised
of such facts, so stated among the explanations of English usages, they
might have curtailed many wanderings of theory, & much "inanity" of remark.
Assisted by the foregoing observations, the advantages possessed by this new im-
provement in writing, which is to supply the deficiency of system in former
schemes, & mark what is here regarded as most consistent, classical & practical
may be more directly appreciated.—

15. The improvement called lektography is a new system of oral distinction;
& a new & systematic representation of oral distinctions & signs, adapted to a more
exact analysis & a more analogous classification & expression of the sounds of words,
than is found in any one other theory or notation. It differs from all other schemes
of pronunciation & writing now known, in distinguishing vowel sounds by classes,
& series, according to their general analogies; adding a third class, & its analogy,
in defining these analogies & classes by means of the letter R, in uniforming the
class signs, in using letters only for representing the sounds of the vowels, re-
jecting the employment of numeral ciphers & other additional marks, not now
part of the orthography of English words; in shewing the affinity & formation of
the compound consonants by their letters. & in employing for these objects, the
most simple & practical usages of the common orthography of the English &
other languages in the Roman characters — — — —

16. It distinguishes all the vowel sounds, & separately represents them by appropri-
ate letters & class signs; without parting syllables or letters by hyphens or
accents for that purpose, though these may be so employed; and without
double letters; & the mute e after consonants. It distinguishes by class & notation,
the sounds of vary, airy, carry, starry, her, heriot, hurry &c, uniforms the
signs of like sounds, in all, ought, nor: &c, & restores the analogy of ro,

/ m, &c. loud, fend. &c. 17. As a system of oral distinction; it separates or distributes the vowel sounds, by three general analogies, into three classes, so as to be represented by distinct class marks, exponents or sorts of expression; and into a fourth class formed of leading & following sounds in the same syllables, usually called diphthongal sounds — These classes & general analogies are here exemplified by the following words; and other words of the same vowel sounds, or nearly the same, or such as are usually distinguished or named alike in the languages of Europe, by native or foreign writers, as being nearly equivalent in sound, are alike claimed to exemplify the same analogies of sound, & distinctions of the voice, similarly distributed, however expressed in orthography.

1st aid, ceil, wijn, (Dutch) scritoire, fruit; daily, key, why, bow (bog, German) threw; sae, (Scotch) see, die, doe, true; gain, (gegen, Ger.,) signore (Ital.) signe (togne, de, (dugend,) fate, theme, wine, note, rule: &c. [illegible]

2d, shall, well, him, on, us; man, men, this, not, but, &c. [illegible]

3d, air, her, farm, nor, full; full, fare, fleur, (Fr.) J.A.H. war, would, there, word [illegible] awe, worsted; &c. 4th (e Mayhew,) fend, ay, annoy, (e Voe Eve.). loud, few, die (broad) void, lauten, (Ger. [illegible]:) cube, hanl, (Welsh) — [illegible], (Welsh) town, &c. 18. It defines the analogies, according to which the vowel sounds are classed, being clearly distinguished & exemplified in combinations of these classes with the letter R, as in they, & they're, see, seer, high, hire, foe, fore, true, truer; & the like sounds for the first class — as in carry, arid, merry, peril, mirror, myriad, morrow, moral, hurry, nourish, &c. without stress in array, erroneous, irradiate, corrode, surreption: for the second class; and as in air (AHr) traire, Fr, (TRAHeRe; her, surround, further (fuhren, fboden, FERRE, VEHeRe) farm, ([illegible]) Zarba ([illegible]) J.A.H (eJH); nor, ought, (ohtAb.) straw, stroke;) [illegible], full; &c. for the third class — To this third class the R, may be added without the perceptibly distinct half syllable heard in they're, seer, hire, &c. of the first class; & the R may be disused after this class, as in J.A.H awe, full, &c, with some difference of sound; but not of the vowel sounds, so as to lose their class; just as the sounds they, see, high, &c. of the first class, are the same in they're, seer &c, being added to, not altered by the R. The first & third classes are sounds, distinct from the consonants;

yet the third may coalesce with the R: the first combines with the R. dip-
-thong like. But the removal of this consonant as of the others, from the syl-
-lables, made with the second class of the vowels here distinguished as in shall.
man, carry, aid, &c. wholly destroys the distinction & analogy of their class -
The consonants including R. which may be sounded next after the vowels in like
analogy, are therefore the natural & proper signs of the second class, in such
position; their presence in such position sufficiently showing this analogy, &
this class of the vowel sounds - The asperates, w. h. i. are the only sounds, whose
signs are exceptions to these second class signs -
19. As a representation of vowel sounds, & their analogies; it differs from all
other systems - The sounds & their distinctions, are wholly represented by letters with-
-out numbers or other marks over the vowel letters. The serviles, letters used
as signs of the first & third classes, are two; & are such as may be varied in sort,
like the other letters of the common orthography, having their varieties of Roman
Italics; &c. but may be represented by commas & other abbreviations; as the silent
or omitted letters are sometimes indicated - The first class have their exponents
in analogy with J. I. I, J or J: the third, with II, or H. &c. The second class
signs are the consonants; w. p. h. excepted. In this manner are generalized the
different Sanscrit abbreviations: & the various equivalents, serviles, circumflexes,
marks of quantity, contractions &c. of different languages: which have flowed
from them, & their distinctions - The vowel letters, class signs, positions, abbrevi-
-ations, & analogies, of the four classes, are uniform & distinct, as in the following
table; referring to the above table of words. Class 1. aj. ej. ij. oj. uj. or ai. ei. &c. for ai.
of aid &c. Class 2. al. el. il. ol. ul. or an, en, &c. for al. of shall &c. " 3. ah. eh. ih,
oh. uh. for ah. of AH r (air) &c. " 4. (au) eu, ie, oe, ou. for eu. of feud &c. - " -
20. It admits of uniform references, or representations, by the same numerals,
or other marks for sounds of the same class. & the same analogy, (with other
numbers or subdivisions, for varieties of usage;) the five vowel letters, A. E. I. O. U,
having each, its several sound in each of three classes, & each a series of
sounds, in analogy with the others - 21. It admits the signs of the first & third
classes, (being letters, & otherwise signs of sounds, which are not articulated next
after & with the vowels) to be represented as silent letters, for distinction of letters
& serviles, by Italics, or other varieties of type, as now practised with the i. of aid.

the a, of learn, the ugh of ought; & with similar differences in other words, according to the particular schemes, & objects of such printing – The vowels by this means, may be ranged without more regard to the services, than is had for the accents in Italian.
22. It requires no other than the common letters & types; such as are used for the common orthography of the English language, being sufficient for representing the classes of the vowels; and thus the vowel letters are equally plain; & are not multiplied by varied additions; but the signs like the sounds are in analogy; & are currently written. The types are conveniently used, as in the most common work of printing: and types of the smallest size may be used, as for the common orthography: without the inconvenience of different overmarks; & the wider spaces necessary for them – 23. It admits the mark of stress next after the vowel letters, or next over them, in all the classes alike; no parting of the syllables being necessary to exhibit the proper sounds of the classes. The vowel sounds have the same expression in every variety of position; (marks of stress excepted) whether in stress or not in stress; save that sounds of the first class at the end of words, may be signified by such position: as I. me. simile &c. Such is the common usage in naming the vowel letters; an a, ane, an i, an o, anu (for u. of rule, oo of ooze) where an, is used in like analogy; so in an axe, an egg, an inn, an ox, an uncle. The latter R. (& the British article y. ye.) marks the same analogy, as in ray, reel, rye, roll, rule; ran, rest, rill, rod, run, & the like. .. .. ..
24. It differs from all other systems, as a representation of the consonant sound of I, & its combinations exhibited in the words, soldier, christian, brazier, mansion, folio, senoir, clothier, & the like; in advancing the general analogy of these expressions; when the i is not vocal or diphthongal; as when it is, in such words as champion; &c. of another analogy. In the varieties of combination above stated, the same consonant element is observable, though the letters combined may belong to different words; as in he-told-you, that-year, his-use, this-year; &c. when quickly spoken. It represents the constant element of these combinations, by the letter i or j, in agreement with the existing orthography of the numerous Latin derivations in the English language, in which it is now found; the uniform expressions of these formations, already exceeding all the other varieties collectively. The i; consonant is therefore the best letter for the sound which is common to them all, distinguished from the vowel form & uses of the I. as in the modern notation of hallelu-jah, (JH) & the like notation of Italian, Dutch, German &c. or the Latin of these nations. In this analogy, the same common element has the uniform expression of its value or effect, in soldjer, christjan, brazjer, mansjons, folje, senjor, clothjer; & other like words: or in the usual varieties of letter, Italic, &c — — —

25. It has other distinctions of sound & signs; which are less peculiar, such are, dh, th, ng; or Δ e ɤ; or corresponding substitutions of other letters, for the different representations used by English & French orthoepists, for the sounds of th. & ng, in the words this thing. With dh, th, ng, for these sounds, twenty-two letters of the common alphabet are sufficient for representing all the elements of English pronunciation according to the exact analysis above specified; the letters c. Q X Y. being superfluous — — —

26. It differs from all other systems in advancing the application made of the vowel letters in three classes, (and the extent of their diversities of value) as the primitive general uses of the vowel letters in the best pronunciation of the Latin language. And hence it is calculated, & intended, to discredit affectations of foreign & other peculiarities of articulation in public schools, & in reading & speaking the English language:- to enlist the partiality of those who speak this language in favour of its proper general usages - & to disburden the natives of the uncomfortable regards for it entertained with the general opinion of the classical or Latin origin of the Frank & arabic E & I. ain & ya.

27. It possesses classes & distinctions of the vowel sounds more consistent with their analogies than those which now obtain in the orthography of the modern languages, so called, or the schemes of orthoepists: & may introduce a more appropriate & intelligible use of terms for the different vowel sounds, or classes. And the third class, having its general analogy, & being like the others, susceptible of syllabic, & verse stresses, may also introduce a more correct use of the language of prosody; & show the phrases, short longs, & long shorts, (or shuts) were necessary consequences of the shorts or longs, names of sounds, not being convertible terms, for the shorts or longs of verse — — —

28. Lastly; it exhibits the most complete uniform of which the English language is susceptible, with the fewest alterations of present usages, necessary for that object, were it proposed; and is therefore the best general system of usages for readers of this language; showing it to be more consistent with analogy & the natural distinctions of the voice, than the orthography of most other languages. It is convenient as a common measure of the various usa-ges of this language, & of all other usages of like, or of nearly like values; rep-resenting their common agreements & differences, with greater exactness than is usual in any other method of notation; being selected from the similar usages of the French, English, Greek, Latin, & other languages, or conformed to their analogies. —

Witnesses

B. L. Oliver Jr.

B. Merrill

Joseph B. Manning (8194 words)

Exd.
[illegible]